(12) United States Patent
Ro et al.

(10) Patent No.: US 8,860,908 B2
(45) Date of Patent: Oct. 14, 2014

(54) BACKLIGHT UNIT AND LIQUID CRYSTAL DISPLAY INCLUDING THE SAME

(75) Inventors: Seung-Mock Ro, Yongin (KR); Young-Min You, Yongin (KR); Won-Il Lee, Yongin (KR); Nam-Jin Jang, Yongin (KR); Joo-Young Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 496 days.

(21) Appl. No.: 12/955,447

(22) Filed: Nov. 29, 2010

(65) Prior Publication Data

US 2012/0050149 A1 Mar. 1, 2012

(30) Foreign Application Priority Data

Aug. 25, 2010 (KR) ........................ 10-2010-0082560

(51) Int. Cl.
*G02F 1/1335* (2006.01)
*F21V 7/04* (2006.01)
*F21V 8/00* (2006.01)

(52) U.S. Cl.
CPC ............ *G02B 6/0016* (2013.01); *G02B 6/0083* (2013.01); *G02B 6/002* (2013.01); *G02B 6/0091* (2013.01); *G02B 6/0088* (2013.01)
USPC ............................................. 349/65; 362/621

(58) Field of Classification Search
USPC ....................................................... 362/621
See application file for complete search history.

(56) References Cited

U.S. PATENT DOCUMENTS

| 2004/0130880 | A1* | 7/2004 | Min et al. ........................ 362/31 |
| 2006/0238367 | A1* | 10/2006 | Tsuchiya ................... 340/815.4 |
| 2007/0121342 | A1* | 5/2007 | Tamura et al. ................ 362/608 |
| 2008/0278659 | A1* | 11/2008 | Park ............................... 349/65 |

FOREIGN PATENT DOCUMENTS

| KR | 10-2007-0032174 | | 3/2007 |
| KR | 10-2007-0043 | * | 4/2007 |
| KR | 10-2007-0043102 | | 4/2007 |
| KR | 10-2007-0098096 | | 10/2007 |
| KR | 10-2010-0030910 | | 3/2010 |

* cited by examiner

*Primary Examiner* — Bumsuk Won
*Assistant Examiner* — Ryan Crockett
(74) *Attorney, Agent, or Firm* — Robert E. Bushnell, Esq.

(57) ABSTRACT

A backlight unit having improved luminance and uniformity includes a light source and a light guide panel having a light receiving portion which receives light emitted from the light source and which has a pattern including a plurality of protrusions. Each of the protrusions has inclined surfaces forming an angle with respect to the tangential direction of the light receiving portion. The inclined surfaces include a first inclined surface relatively close to the center of the light receiving portion and a second inclined surface relatively close to the edge of the light receiving portion. A first inclination angle formed by the first inclined surface with respect to the tangential direction of the light receiving portion is smaller at the edge of the light receiving portion than at the center of the light receiving portion.

19 Claims, 11 Drawing Sheets

BACKLIGHT UNIT AND LIQUID CRYSTAL DISPLAY INCLUDING THE SAME

CLAIM OF PRIORITY

This application makes reference to, incorporates the same herein, and claims all benefits accruing under 35 U.S.C. §119 from an application earlier filed in the Korean Intellectual Property Office on Aug. 25, 2010 and there duly assigned Serial No. 10-2010-0082560.

BACKGROUND OF THE INVENTION

1. Field of the Invention

The present invention relates generally to a backlight unit and a liquid crystal display (LCD) including the same and, more particularly, to a backlight unit having improved luminance and uniformity and a liquid crystal display (LCD) including the backlight unit.

2. Description of the Related Art

A liquid crystal display (LCD) has advantages, such as slimness, lightness, and low power consumption, such that it replaces the existing cathode ray tube (CRT). As a result, the liquid crystal display (LCD) has been prevalently used for midsize and large products such as a monitor, a TV and small-sized products, such as mobile phones, personal digital assistants (PDAs), and portable multimedia players (PMPs).

Generally, the liquid crystal display (LCD) includes a liquid crystal display panel using the optical properties of a liquid crystal and drives the liquid crystal display panel, thereby displaying image data. However, a liquid crystal used for the liquid crystal display panel does not perform self emission, such that it requires a separate light source.

Therefore, a rear surface of the liquid crystal display panel is provided with a backlight unit, including a light source and a light guide panel for receiving light emitted from the light source and for diffusing the light, such that light is irradiated to the liquid crystal display panel through the backlight unit, thereby implementing identifiable images. As the light source included in the backlight unit, the light emitting diode (LED) may be used. The LED may be used by being disposed on one side surface of the light guide panel.

As such, as light is incident on the light guide panel from the light source and the incident light is irradiated to the liquid crystal display panel, the luminance around a light receiving portion of the light guide panel adjacent to the light source may be relatively high, while a dark portion may be generated in a portion at which the light emitted from the light source does not arrive. Owing to the difference in luminance, the uniformity of an image through the liquid crystal display panel is deteriorated, such that the display quality of the liquid crystal display (LCD) may be deteriorated.

In addition, light may be leaked while the light emitted from light source is inputted through the light receiving portion of the light guide panel. Owing to the leakage of light, the entire luminance of the image may be deteriorated.

The above information disclosed in this Background section is only for an enhancement of an understanding of the background of the described technology, and therefore it may contain information that does not form the prior art which is already known in this country to a person of ordinary skill in the art.

SUMMARY OF THE INVENTION

The present invention has been developed in an effort to provide a backlight unit having advantages of luminance and uniformity which are improved by modifying the structure of a light receiving portion of a light guide panel, and to provide a liquid crystal display including the backlight unit.

An exemplary embodiment of the invention provides a backlight unit which comprises: a light source and a light guide panel having a light receiving portion which receives light emitted from the light source and which has a pattern including a plurality of protrusions. Each of the protrusions has inclined surfaces forming an angle with respect to the tangential direction of the light receiving portion. The inclined surfaces may include a first inclined surface relatively close to the center of the light receiving portion and a second inclined surface relatively close to the edge of the light receiving portion. A first inclination angle formed by the first inclined surface with respect to the tangential direction of the light receiving portion may be smaller at the edge of the light receiving portion than at the center of the light receiving portion.

The first inclination angle may gradually decrease toward the edge of the light receiving portion from the center of the light receiving portion.

The first inclination angle may be about 40° to about 50° at the center of the light receiving portion, and about 0° to about 10° at the edge of the light receiving portion.

A second inclination angle, formed by the second inclined surface with respect to the tangential direction of the light receiving portion, may be larger at the edge of the light receiving portion than at the center of the light receiving portion.

The second inclination angle may gradually increase toward the edge of the light receiving portion from the center of the light receiving portion.

The second inclination angle may be about 40° to about 50° at the center of the light receiving portion, and about 70° to about 80° at the edge of the light receiving portion.

The pattern of the light receiving portion may be symmetric with respect to the center of the light receiving portion.

The plan shape of the protrusion may be an equilateral trapezoid or an isosceles triangle at the center of the light receiving portion, and the plan shape of the protrusion may be a right triangle at the edge of the light receiving portion.

The light source may be a light emitting diode (LED).

The backlight unit may further include a reflective sheet disposed under the light guide panel.

The backlight unit may further include an optical sheet disposed above the light guide panel.

Another exemplary embodiment of the invention provides a liquid crystal display which comprises: a liquid crystal display panel; a backlight unit including a light source and a light guide panel having a light receiving portion which receives light emitted from the light source and which has a pattern including a plurality of protrusions; and a mold frame accommodating the liquid crystal display panel and the backlight unit. Each of the protrusions has inclined surfaces forming an angle with respect to the tangential direction of the light receiving portion. The inclined surfaces may include a first inclined surface relatively close to the center of the light receiving portion and a second inclined surface relatively close to the edge of the light receiving portion. A first inclination angle, formed by the first inclined surface with respect to the tangential direction of the light receiving portion, may be smaller at the edge of the light receiving portion than at the center of the light receiving portion.

The first inclination angle may gradually decrease toward the edge of the light receiving portion from the center of the light receiving portion.

The first inclination angle may be about 40° to about 50° at the center of the light receiving portion and about 0° to about 10° at the edge of the light receiving portion.

A second inclination angle, formed by the second inclined surface with respect to the tangential direction of the light receiving portion, may be larger at the edge of the light receiving portion than at the center of the light receiving portion.

The second inclination angle may gradually increase toward the edge of the light receiving portion from the center of the light receiving portion.

The second inclination angle may be about 40° to about 50° at the center of the light receiving portion, and about 70° to about 80° at the edge of the light receiving portion.

The pattern of the light receiving portion may be symmetric with respect to the center of the light receiving portion.

According to the exemplary embodiments of the invention, it is possible to improve the entire luminance by improving the structure of the light receiving portion of the light guide panel so as to reduce leakage of light.

Furthermore, it is possible to improve uniformity and prevent a dark portion from being generated by increasing the exit angle of the light source.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
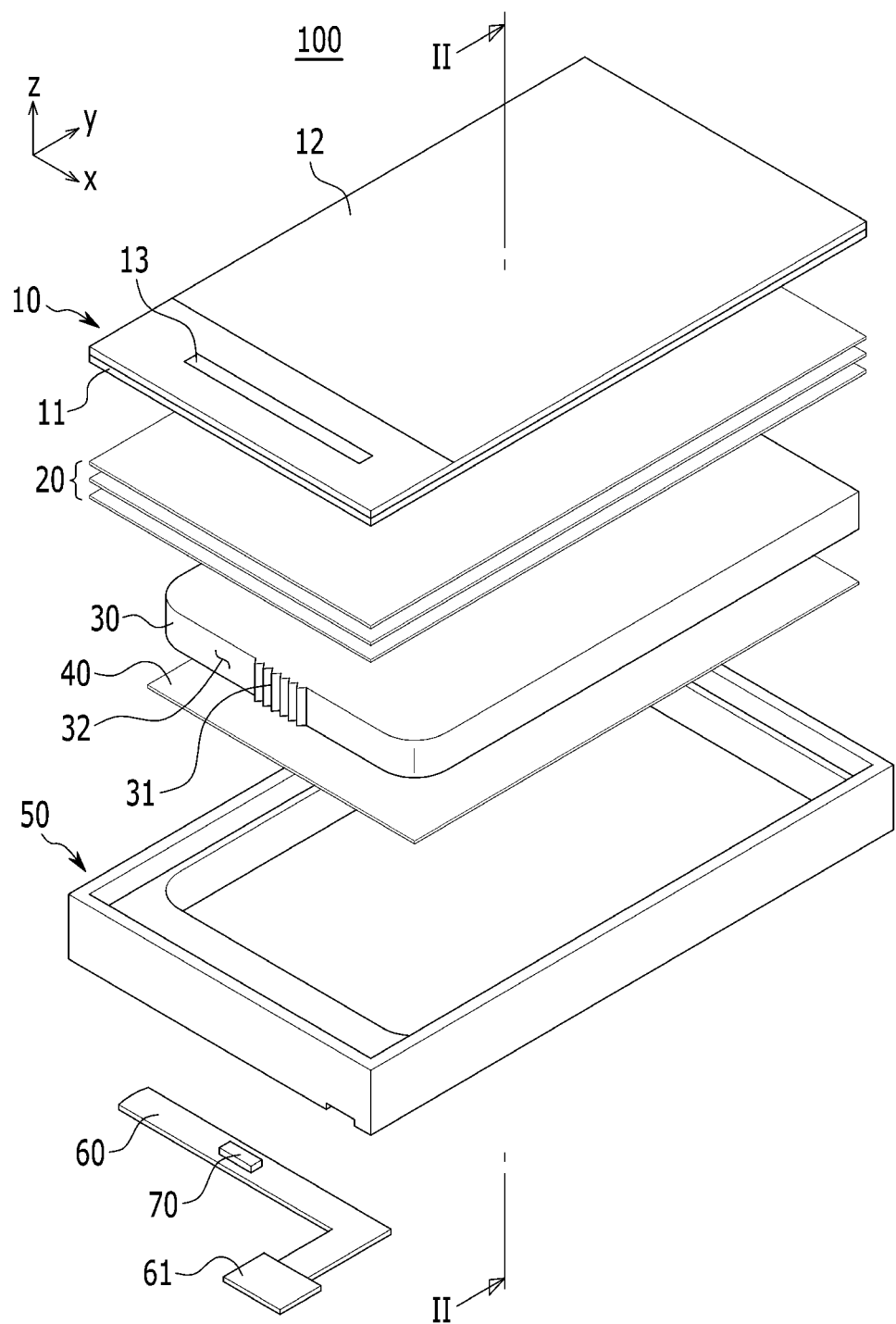
FIG. 1 is a schematic exploded perspective view of a liquid crystal display (LCD) according to a first exemplary embodiment of the invention.

The present invention will be described more fully hereinafter with reference to the accompanying drawings, in which exemplary embodiments of the invention are shown. The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

Figure 2:
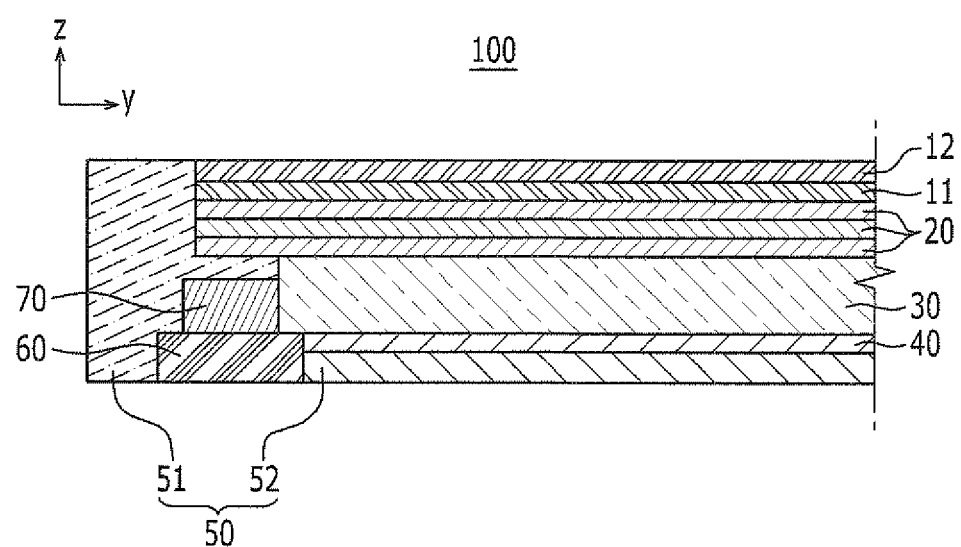
FIG. 2 is a cross-sectional view of the liquid crystal display (LCD) according to the first exemplary embodiment, taken along line II-II of FIG. 1.

FIG. 1 is a schematic exploded perspective view of a liquid crystal display (LCD) according to a first exemplary embodiment of the invention, and FIG. 2 is a cross-sectional view of the liquid crystal display (LCD) according to the first exemplary embodiment of the invention, taken along the line II-II of FIG. 1.

Referring to FIG. 1 and FIG. 2, a liquid crystal display (LCD) 100 according to the first exemplary embodiment of the invention includes a liquid crystal display panel 10, a backlight unit, and a mold frame 50 accommodating them.

The liquid crystal display panel 10 includes a thin film transistor (TFT) substrate 11 and a color filter substrate 12 which are disposed so as to be opposite to each other, and liquid crystal (not shown) is injected between the substrates 11 and 12. In this case, the thin film transistor substrate 11 and the color filter substrate 12 are made of a material, such as glass.

A thin film transistor, a capacitor, and a pixel electrode are formed on the thin film transistor substrate 11, a gate line and a data line are connected the gate electrode and the source electrode of the thin film transistor, respectively, and a pixel electrode is connected to the drain electrode of the thin film transistor. The gate line and data line of the thin film transistor substrate 11 are connected to a printed circuit board (not shown), such that electric signals are inputted to the gate electrode and the source electrode of the thin film transistor by inputting an electric signal into the printed circuit board. The thin film transistor is turned on/off in accordance with the inputted electric signals, and the electric signal required for driving the liquid crystal is outputted to the drain electrode.

A color filter in which RGB pixels are formed, and a common electrode formed of a transparent electrode, such as ITO (Indium Tin Oxide) and IZO (Indium Zinc Oxide), are formed on the color filter substrate 12. When power is applied to the gate electrode and the source electrode of the thin film transistor and the thin film transistor is turned on, an electric field is generated between the pixel electrode of the thin film transistor substrate 11 and the common electrode of the color filter substrate 12. The alignment angle of the liquid crystal injected between the thin film transistor substrate 11 and the color filter substrate 12 is changed by the electric field, and the light transmittance is changed according to the changed alignment angle, thereby making it possible to obtain the desired pixels.

An integrated circuit chip 13 is mounted on the thin film transistor substrate 11 to control the liquid crystal display panel 10. The integrated circuit chip 13 generates a plurality of timing signals so as to apply gate driving signals and data driving signals at an appropriate time, and then to apply them to the gate line and the data line, respectively, of the liquid crystal display panel 10.

Meanwhile, a polarizing plate may be further attached to both sides of the liquid crystal display panel 10 so as to polarize light passing through the liquid crystal display panel 10.

A backlight unit for emitting light to the liquid crystal display panel 10 is formed under the liquid crystal display panel 10. The backlight unit includes a light source and a light guide panel 30 which receives and diffuses light emitted from the light source. The light guide panel 30 includes a light receiving portion 31 formed on an end surface 32 of the light guide panel 30. Although a light emitting diode (LED) 70 is used as the light source in the first exemplary embodiment, the present invention is not limited thereto.

In the first exemplary embodiment of the invention, the light emitting diode 70 is mounted on a flexible printed circuit board (FPCB) 60, as shown in FIG. 2, and is disposed at one side of the light guide panel 30. A plurality of wire patterns (not shown) are formed on the flexible printed circuit board 60 so as to be electrically connected to the light emitting diode 70. Accordingly, a voltage from the outside is applied to the flexible printed circuit board 60 through a connection part 61, thereby making it possible to drive the light emitting diode 70.

Meanwhile, the backlight unit may further include an optical sheet 20 disposed between the light guide panel 30 and the liquid crystal display panel 10, and a reflective sheet 40 is disposed under the light guide panel 30. The optical sheet 20 may include a diffusion sheet, a prism sheet, and a protective sheet, etc., in order for light passing through the light guide panel 30 to be perpendicularly received to the liquid crystal display panel 10. Furthermore, the reflective sheet 40 is provided to minimize loss of light and to reflect light emitted from the bottom of the light guide panel 30 toward the optical sheet 20.

The liquid crystal display panel 10, the backlight unit including the flexible printed circuit (FPC) board 60 where the light emitting diode 70 is mounted, and the light guide panel 30 are accommodated in the mold frame 50 which has a side wall 51 and bottom portion 52. Although it is exemplified in the first exemplary embodiment that the liquid crystal display panel 10 and the backlight unit are accommodated in one mold frame 50, an upper chassis or a lower chassis may be further formed to provide supplemental strength in the mold frame 50. Alternatively, the mold frame 50 may be integrally formed by a chassis made of SUS (steel use stainless) having high strength, and a mold made of a shock-absorbing material by injection molding. As described above, the structure of the mold frame for accommodating the liquid crystal display panel 10 and the backlight unit may be modified in various shapes, and the present invention is not limited to those shown in the drawings.

Figure 3:
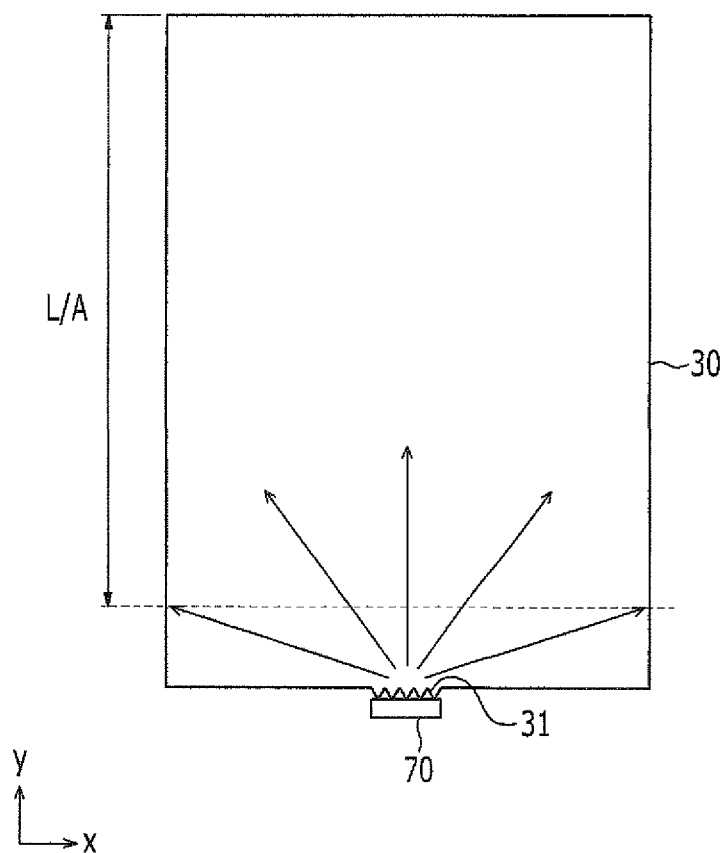
FIG. 3 is a plan view of a backlight unit according to the first exemplary embodiment of the invention.

FIG. 3 is schematic plan view of the backlight unit according to the first exemplary embodiment of the invention. Referring to FIG. 3, a light emitting diode 70 is disposed at one side of the light guide panel 30 of the backlight unit according to the first exemplary embodiment. In the light guide panel 30, the light receiving portion 31 is formed where the light emitting diode 70 is disposed, and light is received from the light receiving portion and diffused throughout light guide panel 30.

Meanwhile, a light emitting area L/A corresponding to the display area of the liquid crystal display panel 10 is formed in the light guide panel 30. In other words, the light emitted from the light emitting area L/A to the liquid crystal display panel 10 is used to implement an actual image. Accordingly, the light emitting area L/A corresponds to the display area of the liquid crystal display panel 10, and is formed so as to have the same size as, or a larger size than, the display area.

If the light received from the light emitting diode 70 fails to reach a part of the light emitting area L/A, a dark portion is generated at the portion, thereby generating a defect in the image. For this reason, when there is a difference in luminance at the parts of the light emitting area L/A, uniformity of luminance of the image through the liquid crystal display panel 10 is deteriorated, thereby deteriorating display quality of the liquid crystal display (LCD). Furthermore, the light emitted from the light source may leak while being received through the light receiving portion of the light guide panel, and the entire luminance of the image may be deteriorated by the leakage of the light.

As described above, the light emitted from the light emitting diode 70 should be uniformly diffused over the light emitting area L/A of the light guide panel 30 through the light receiving portion 31 without leaking in order to ensure the display quality of the liquid crystal display (LCD) 100.

For this purpose, the light passing through the light receiving portion 31 should be diffused at an exit angle above a predetermined angle. However, the light emitted from the light emitting diode 70 travels in the tangential direction (y-axis direction in FIG. 3) to the light receiving portion 31 and has straightness, such that a desired exit angle cannot be obtained when the light receiving portion 31 is formed flat.

Therefore, a saw-toothed pattern is formed in the light receiving portion 31 of the light guide panel 30 so as to improve luminance and uniformity of the liquid crystal display (LCD) 100 (FIGS. 1 and 2) by obtaining a desired exit angle in the first exemplary embodiment.

Figure 4:
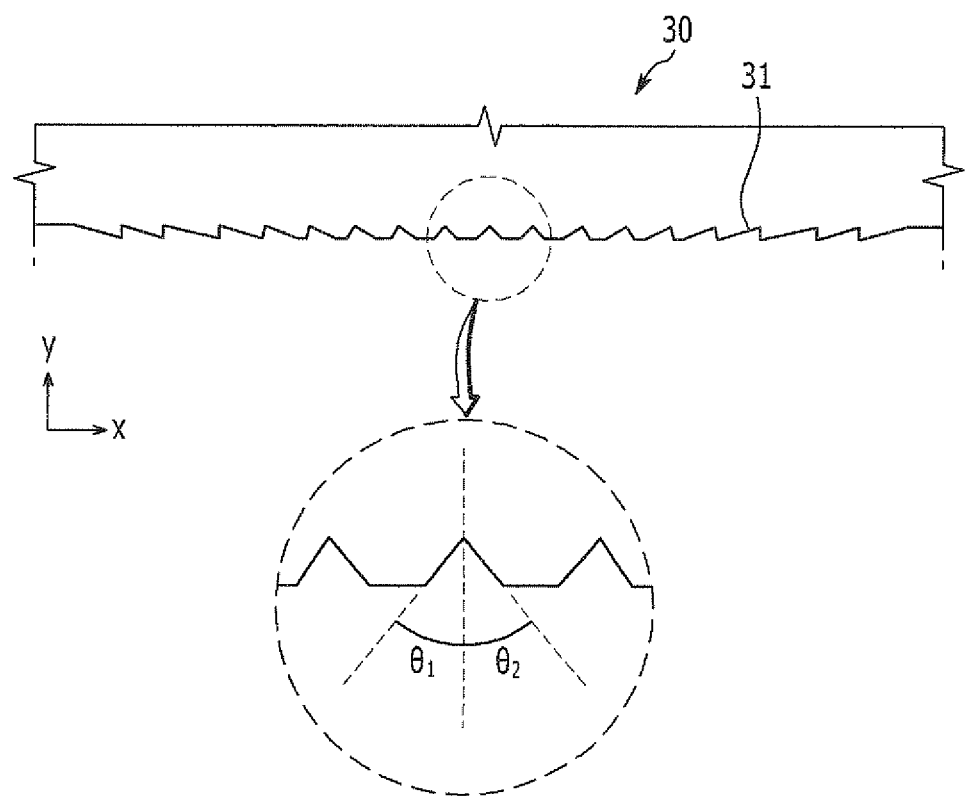
FIG. 4 is a plan view enlarging a light receiving portion of a light guide panel according to the first exemplary embodiment of the invention.

FIG. 4 is an enlarged view of the light receiving portion of the light guide panel according to the first exemplary embodiment of the invention.

Referring to FIG. 4, the pattern of the light receiving portion 31 according to the first exemplary embodiment will be described in detail. Specifically, the pattern of the light receiving portion 31 according to the first exemplary embodiment is formed in a saw-toothed shape having a plurality of protrusions, and in a column shape in which the plan shape of the plurality of protrusions is a trapezoid or a triangle, when seen from above the light guide panel 30 (in z-axis direction). Furthermore, the pattern of the light receiving portion 31 is formed left-right symmetrically with respect to the center of the light receiving portion 31.

As described above, the light emitted from the light emitting diode 70 (FIG. 3) travels in the tangential direction (y-axis direction) with respect to the light receiving portion 31, and each of the protrusions has an inclined surface having a predetermined angle with respect to the tangential direction (y-axis direction) of the light receiving portion 31. As seen in FIG. 4, the inclined surfaces include a left inclined surface positioned at the left side of the protrusion and a right inclined surface positioned at the right side of the protrusion.

Hereinafter, assume that the angle formed by the right inclined surface of each of the protrusions with respect to the tangential direction (y-axis direction) of the light receiving portion 31 is a first inclination angle $\theta_1$ and the angle formed by the left inclined surface with respect to the tangential direction (y-axis) of the light receiving portion 31 is a second inclination angle $\theta_2$.

In the first exemplary embodiment, referring to FIG. 4, the first inclination angle $\theta_1$ at the left edge of the light receiving portion 31 is smaller than the first inclination angle $\theta_1$ at the center of the light receiving portion 31, while the second inclination angle $\theta_2$ at the right edge of the light receiving portion 31 is smaller than the second inclination angle $\theta_2$ at the center of the light receiving portion 31. Furthermore, the first inclination angle $\theta_1$ at the right edge of the light receiving portion 31 is larger than the first inclination angle $\theta_1$ at the center of the light receiving portion 31, while the second inclination angle $\theta_2$ at the left edge of the light receiving portion 31 is larger than the second inclination angle $\theta_2$ at the center of the light receiving portion 31.

In this case, the first inclination angle $\theta_1$ gradually decreases and the second inclination angle $\theta_2$ gradually increases from the center of the light receiving portion 31 to the left edge of the light receiving portion 31. Furthermore, the first inclination angle $\theta_1$ gradually increases and the second inclination angle $\theta_2$ gradually decreases from the center of the light receiving portion 31 to the right edge of the light receiving portion 31.

The first inclination angle $\theta_1$ may be about 40° to about 50° at the center of the light receiving portion 31, and may be about 0° to about 10° at the left edge and about 70° to about 80° at the right edge, respectively, of the light receiving portion 31. Furthermore, the second inclination angle $\theta_2$ may be about 40° to about 50° at the center of the light receiving portion 31, and may be about 70° to about 80° at the left edge and about 0° to about 10° at the right edge, respectively, of the light receiving portion 31.

In order to assist in an understanding the first exemplary embodiment, the above configuration is described again under the assumption that, in the inclined surfaces formed in one protrusion, the inclined surface relatively closer to the center of the light receiving portion 31 is the first inclined surface and the inclined surface relatively further from the edges of the light receiving portion 31 is the second inclined surface. In other words, referring to FIG. 4, the right inclined surface and the left inclined surface correspond to the first inclined surface and the second inclined surface, respectively, at the left side relative to the center of the light receiving portion 31, while the right inclined surface and the left inclined surface correspond to the second inclined surface and the first inclined surface, respectively, at the right side relative to the center of the light receiving portion 31.

The inclination angle formed by the first inclined surface with respect to the tangential direction of the light receiving portion 31 decreases toward the edge of the light receiving portion from the center of the light receiving portion 31. Furthermore, the inclination angle formed by the second inclined surface with respect to the tangential direction of the light receiving portion 31 increases toward the edge of the light receiving portion from the center of the light receiving portion 31. In this case, the inclination angle formed by the first inclined surface relatively closer to the center of the light receiving portion 31 with respect to the tangential direction of the light receiving portion 31 may be about 40° to about 50° at the center of the light receiving portion 31, and may be about 0° to about 10° at the edge of the light receiving portion 31. Furthermore, the inclination angle formed by the second inclined surface relatively closer to the edge of the light receiving portion 31 with respect to the tangential direction of the light receiving portion 31 may be about 40° to about 50° at the center of the light receiving portion 31, and may be about 70° to about 80° at the edge of the light receiving portion 31.

As described above, the inclination angles $\theta_1$ and $\theta_2$ formed by the inclined surfaces at the left and right of one protrusion with respect to the tangential direction of the light receiving portion 31 are substantially the same at the center of the light receiving portion 31, such that the plan shape of the protrusion may be similar to an equilateral trapezoid. Furthermore, the inclination angles $\theta_1$ and $\theta_2$ formed by the inclined surfaces at the left and right of one protrusion with respect to the tangential direction of the light receiving portion 31 are different at both sides of the light receiving portion 31, such that the plan shape of the protrusion may be similar to a right triangle.

Meanwhile, the pattern of the light receiving portion 31 may be symmetric at both sides with respect to the center of the light receiving portion 31.

As described above, in the first exemplary embodiment, a pattern including protrusions is formed in the light receiving portion 31, and the pattern is formed so as to be symmetric at both sides with respect to the light receiving portion 31 while the plan shape of the protrusion is not uniform. In other words, the plan shape of the protrusion is left-right symmetric in an equilateral trapezoid at the center of the light receiving portion 31, and is declined to the center of the light receiving portion 31 toward the left and right, such that the plan shape of the protrusion is similar to a right triangle at both edges.

The exit angle of the light emitted from the light emitting diode 70 can be increased by the pattern of the light receiving portion 31.

Hereinafter, an effect of the first exemplary embodiment will be described on the basis of a detailed experimental result. In the present experiment, luminance and uniformity of liquid crystal displays (LCD) were measured and compared in accordance with the pattern shape of the light receiving portions of light guide panels according to the first exemplary embodiment and a comparative example.

Figure 6:
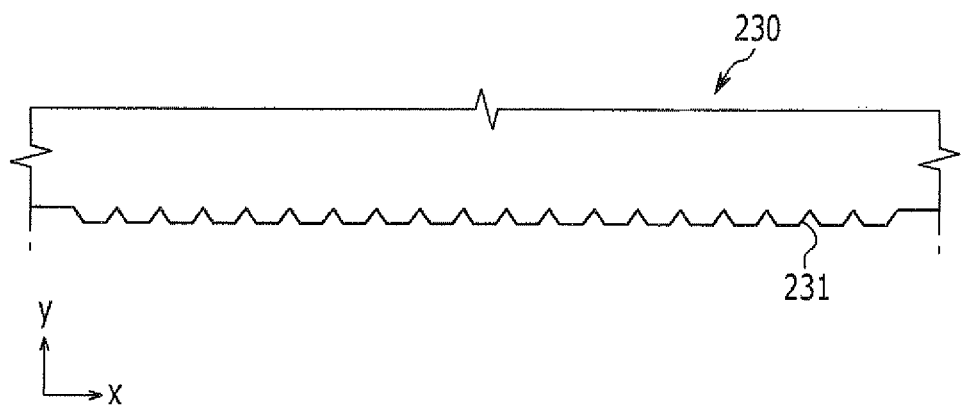
FIG. 6 is a plan view enlarging a light receiving portion of a light guide panel of a comparative example.

FIG. 6 is an enlarged view of a light receiving portion of a light guide panel of a comparative example.

Referring to FIG. 6, a saw-toothed pattern is formed in a light receiving portion 231 of a light guide panel 230 according to the comparative example, and protrusions having the same shape are repeatedly formed, unlike in the first exemplary embodiment.

Figure 7A:
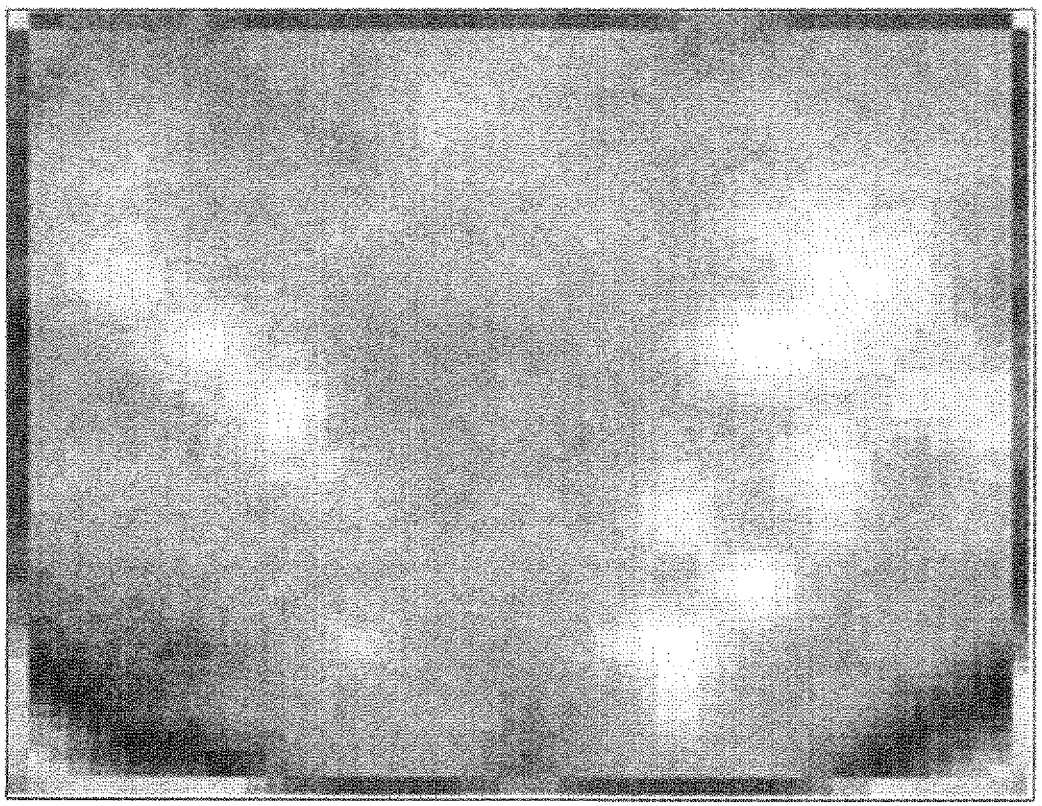
FIG. 7A and FIG. 7B are photographs of light guide panels according to the comparative example and the first exemplary embodiment of the invention, respectively.
Figure 7B:
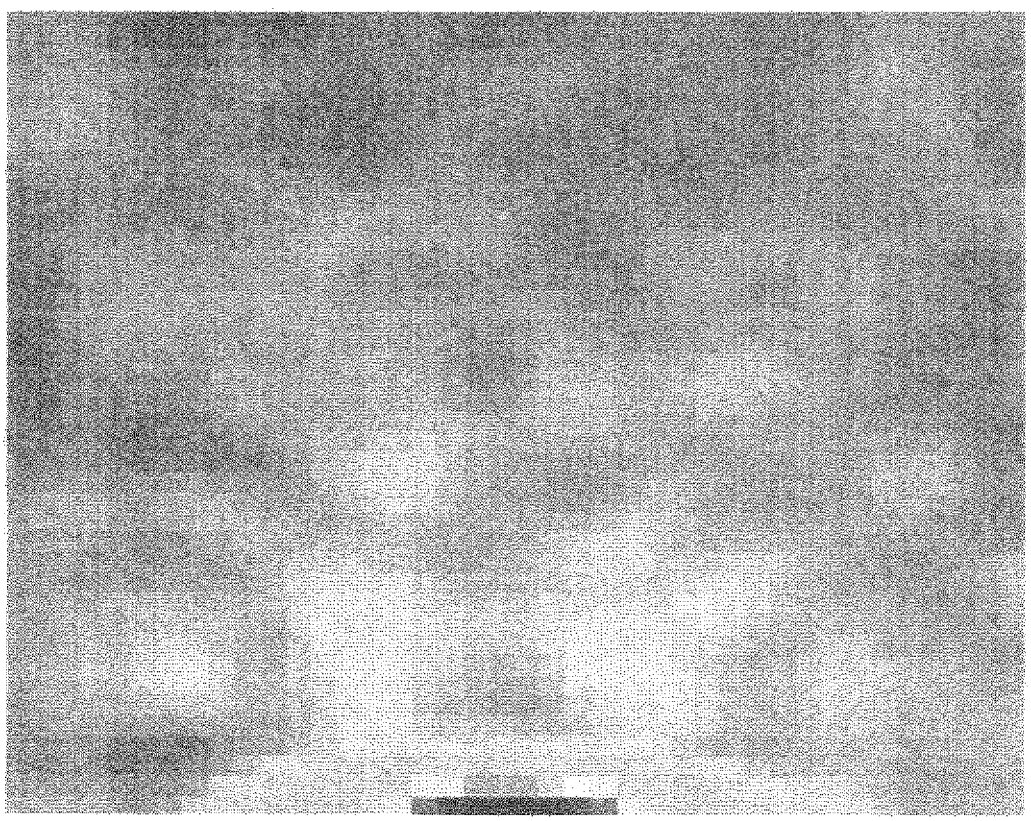

FIG. 7A and FIG. 7B are photographs of the light guide panels according to the comparative example and the first exemplary embodiment of the present invention, respectively.

Referring to FIG. 7A, it can be seen that dark portions are formed at the left and right lower portions and the entire luminance is not uniform in the comparative example in which the protrusions having the same shape are repeatedly formed in the light receiving portion 231. However, referring to FIG. 7B, it can be seen that a dark portion is not generated and uniformity is excellent in the light guide panel 30 according to the first exemplary embodiment of the invention.

Figure 8A:
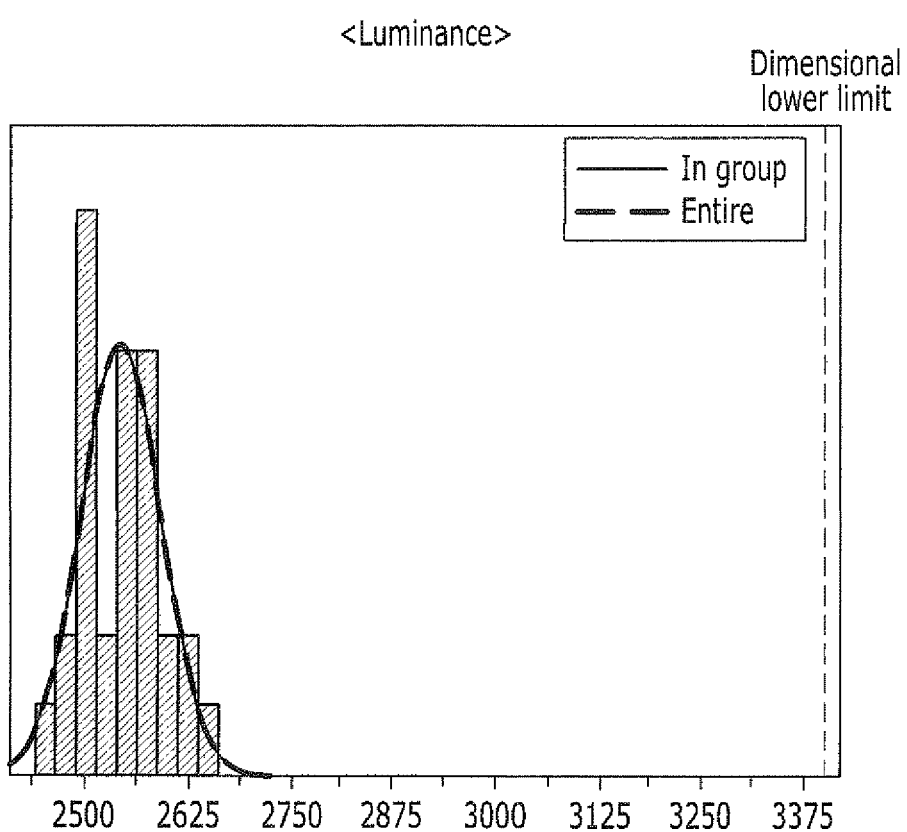
FIG. 8A and FIG. 8B are graphs showing luminance of liquid crystal displays (LCD) according to the comparative example and the first exemplary embodiment of the invention, respectively.
Figure 8B:
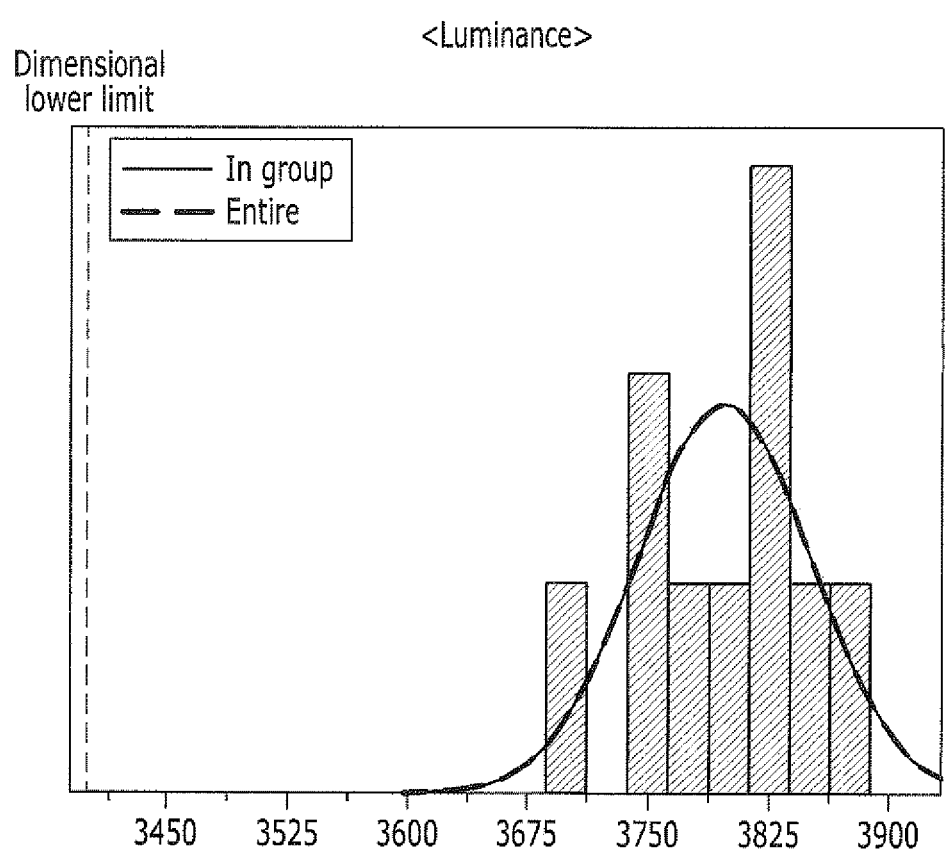

FIG. 8A and FIG. 8B are graphs showing luminance of liquid crystal displays (LCD) according to the comparative example and the first exemplary embodiment of the invention, respectively.

Referring to FIG. 8A, the luminance was in the range of about 2400 cd/m² to about 2700 cd/m² and the average luminance was about 2560 cd/m², which were measured from the liquid crystal display according to the comparative example in which the protrusions having the same shape are repeatedly formed in the light receiving portion 231. Conversely, referring to FIG. 8B, the luminance was in the range of about 3700 cd/m² to about 3900 cd/m² and the average luminance was about 3796.8 cd/m², which were measured from the liquid crystal display 100 according to the first exemplary embodiment of the invention. Thus, it can be seen from the experiments that luminance is improved by forming the pattern of the light receiving portion 31 as in the first exemplary embodiment of the invention.

Figure 9A:
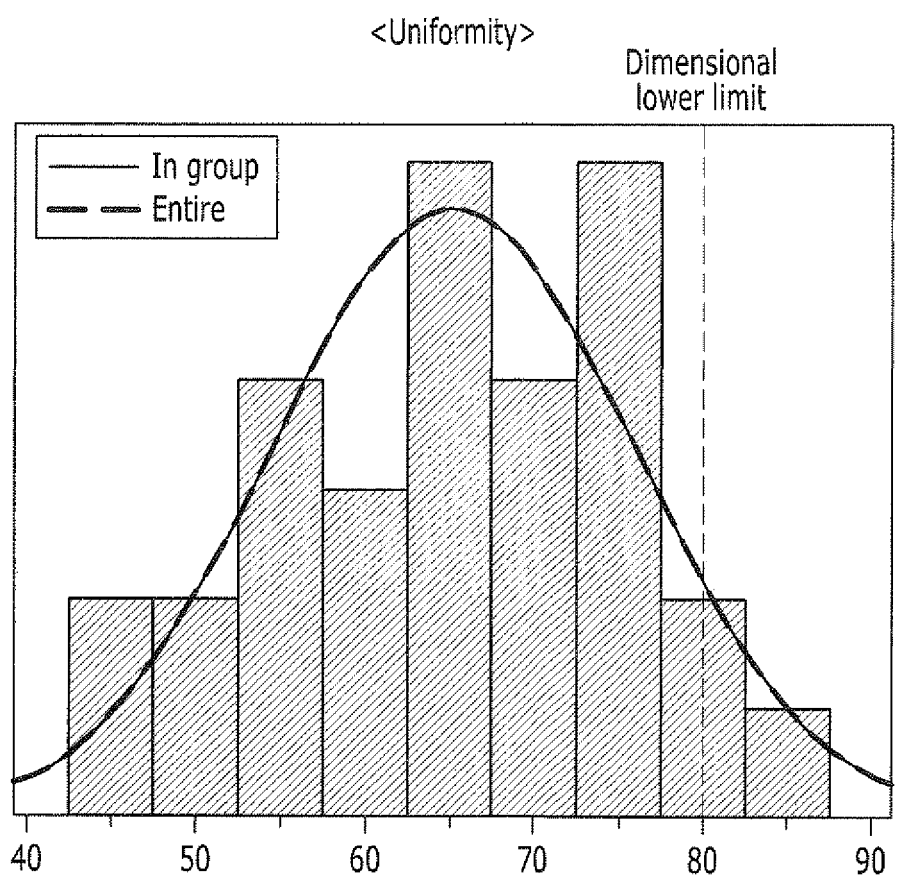
FIG. 9A and FIG. 9B are graphs showing uniformity of liquid crystal displays (LCD) according to the comparative example and the first exemplary embodiment of the invention, respectively.
Figure 9B:
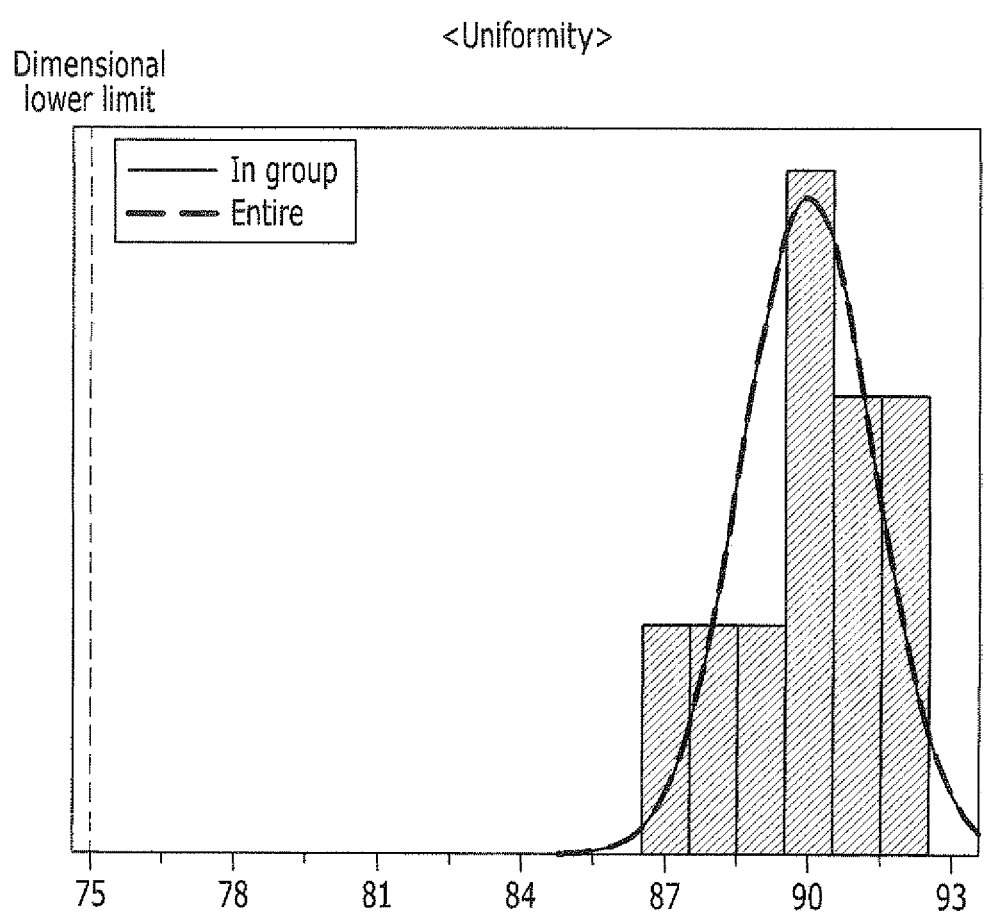

FIG. 9A and FIG. 9B are graphs showing uniformity of the liquid crystal displays (LCD) according to the comparative example and the first exemplary embodiment of the invention, respectively.

Referring to FIG. 9A, the uniformity was in the range of about 45% to about 85% and the average uniformity was about 65%, which were measured from the liquid crystal display (LCD) according to the comparative example. Conversely, referring to FIG. 9B, the uniformity was in the range of about 87% to 92% and the average uniformity was about 89.96%, which were measured from the liquid crystal display (LCD) 100 according to the first exemplary embodiment of the invention. Thus, it can be seen from the experiments that uniformity was also improved by forming the pattern of the light receiving portion 31 as in the first exemplary embodiment of the invention.

As described above, in the liquid crystal display (LCD) according to the exemplary embodiment of the invention, the luminance can be improved by reducing light leakage and the uniformity is improved by diffusing light uniformly throughout the light guide panel 30, with the exit angle increased, by forming a pattern in the light receiving portion of the light guide panel and forming the pattern as described above.

Accordingly, the number of light emitting diodes used for implementing a liquid crystal display in the same size can be reduced, such that it is possible to reduce the manufacturing cost of the liquid crystal display and the power consumed by the liquid crystal display.

Meanwhile, the pattern of the light receiving portion of the light guide panel in the present invention is not limited to that shown in FIG. 4 and the pattern may be formed in various shapes.

Figure 5:
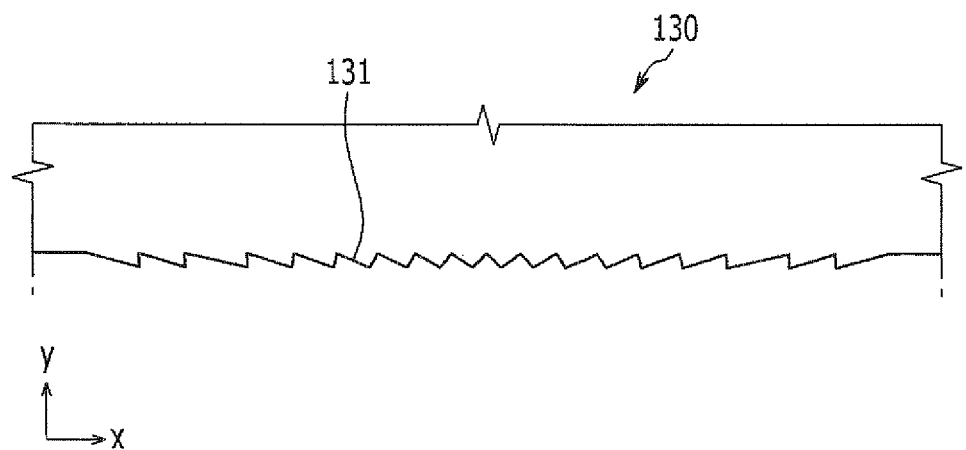
FIG. 5 is a plan view enlarging a light receiving portion of a light guide panel according to a second exemplary embodiment of the invention.

FIG. 5 is an enlarged view of a light receiving portion of a light guide panel according to a second exemplary embodiment of the invention.

Referring to FIG. 5, a light receiving portion 131 of a light guide panel 130 according to the second exemplary embodiment is provided with a pattern which is symmetric with respect to the center of the light receiving portion, which is similar to the first exemplary embodiment of the invention. However, in contrast to the first exemplary embodiment, the plan shape of the protrusion is an isosceles triangle at the center of the light receiving portion 131, and all of the plan shapes of the protrusions are a triangular column in the second exemplary embodiment.

The protrusion of the light receiving portion 131 according to the second exemplary embodiment also has a right inclined surface and a left inclined surface which have a predetermined angle with respect to the tangential direction (y-axis direction) of the light receiving portion 131, and the inclination angles formed by the inclined surfaces with respect to the tangential direction (y-axis direction) of the light receiving portion 131 change in accordance with the positions in the light receiving portion 131. In other words, the protrusions decline to the center of the light receiving portion 131 toward the left and right edges of the light receiving portion 131.

The exit angle of the light received from the light emitting diode is increased by the pattern of the light receiving portion 131, such that the luminance and the uniformity of the liquid crystal display (LCD) can be improved.

Although the present invention has been described above with reference to the exemplary embodiments, the present invention is not limited to the exemplary embodiments. In other words, in the pattern of the light receiving portion including the protrusions, the plan shape of the protrusions may be of various shapes, such as a polygon, a semicircle, or an ellipse, other than the triangle and the quadrangle, and may decline in various shapes. While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight unit, comprising:
a light source; and
a light guide panel having a light receiving portion disposed on a side surface of the light guide panel, the light receiving portion receiving light emitted from the light source and having a pattern including a plurality of protrusions,
each of the protrusions having inclined surfaces forming an angle with respect to a tangential direction of the light receiving portion and a third surface intersecting the inclined surfaces and a major surface of the light guide panel,
the inclined surfaces including a first inclined surface relatively close to a center of the light receiving portion and a second inclined surface relatively close to an edge of the light receiving portion,
a first inclination angle formed by the first inclined surface with respect to the tangential direction of the light receiving portion being smaller at the edge of the light receiving portion than at the center of the light receiving portion, and
a length of an edge of each protrusion being inversely proportional to a distance of the same protrusion from the center of the light receiving portion, wherein the edge of each protrusion is formed by intersecting the major surface of the light guide panel by the third surface of the same protrusion.

2. The backlight unit of claim 1, wherein the first inclination angle gradually decreases toward the edge of the light receiving portion from the center of the light receiving portion.

3. The backlight unit of claim 1, wherein the first inclination angle is about 40° to about 50° at the center of the light receiving portion and about 0° to about 10° at the edge of the light receiving portion.

4. The backlight unit of claim 1, wherein a second inclination angle formed by the second inclined surface with respect to the tangential direction of the light receiving portion is larger at the edge of the light receiving portion than at the center of the light receiving portion.

5. The backlight unit of claim 4, wherein the second inclination angle gradually increases toward the edge of the light receiving portion from the center of the light receiving portion.

6. The backlight unit of claim 4, wherein the second inclination angle is about 40° to about 50° at the center of the light receiving portion and about 70° to about 80° at the edge of the light receiving portion.

7. The backlight unit of claim 1, wherein the pattern of the light receiving portion is symmetric with respect to the center of the light receiving portion.

8. The backlight unit of claim 1, wherein a plan shape of a protrusion is an equilateral trapezoid at the center of the light receiving portion.

9. The backlight unit of claim 1, wherein the light source is a light emitting diode (LED).

10. The backlight unit of claim 1, further comprising a reflective sheet disposed under the light guide panel.

11. The backlight unit of claim 1, further comprising an optical sheet disposed above the light guide panel.

12. A liquid crystal display device, comprising:
a liquid crystal display panel;
a backlight unit including a light source and a light guide panel having a light receiving portion disposed on a side surface of the light guide panel, the light receiving portion receiving light emitted from the light source and having a pattern including a plurality of protrusions; and
a mold frame accommodating the liquid crystal display panel and the backlight unit,
each of the protrusions having inclined surfaces forming an angle with respect to a tangential direction of the light receiving portion and a third surface intersecting the inclined surfaces and a major surface of the light guide panel, the inclined surfaces including a first inclined surface relatively close to a center of the light receiving portion and a second inclined surface relatively close to an edge of the light receiving portion, a first inclination angle formed by the first inclined surface with respect to the tangential direction of the light receiving portion being smaller at the edge of the light receiving portion than at the center of the light receiving portion, and a length of an edge of each protrusion being inversely proportional to a distance of the same protrusion from the center of the light receiving portion, wherein the edge of each protrusion is formed by intersecting the major surface of the light guide panel by the third surface of the same protrusion.

13. The liquid crystal display device of claim 12, wherein the first inclination angle gradually decreases toward the edge of the light receiving portion from the center of the light receiving portion.

14. The liquid crystal display device of claim 12, wherein the first inclination angle is about 40° to about 50° at the center of the light receiving portion and about 0° to about 10° at the edge of the light receiving portion.

15. The liquid crystal display device of claim 12, wherein a second inclination angle formed by the second inclined surface with respect to the tangential direction of the light receiving portion is larger at the edge of the light receiving portion than at the center of the light receiving portion.

16. The liquid crystal display device of claim 15, wherein the second inclination angle gradually increases toward the edge of the light receiving portion from the center of the light receiving portion.

17. The liquid crystal display device of claim 15, wherein the second inclination angle is about 40° to about 50° at the center of the light receiving portion and about 70° to about 80° at the edge of the light receiving portion.

18. The liquid crystal display device of claim 12, wherein the pattern of the light receiving portion is symmetric with respect to the center of the light receiving portion.

19. A backlight unit, comprising:

a light guide panel having a light receiving portion, the light receiving portion disposed on a side surface of the light guide panel, the light receiving portion receiving light emitted from a light source which is disposed at a center of the light receiving portion and having a pattern consisting of a plurality of continuously formed triangular protrusions, each of the triangular protrusions having inclined surfaces forming an angle with respect to a tangential direction of the light receiving portion, the inclined surfaces including a first inclined surface relatively close to the center of the light receiving portion and a second inclined surface relatively close to an edge of the light receiving portion, a first inclination angle formed by the first inclined surface with respect to the tangential direction of the light receiving portion being smaller at the edge of the light receiving portion than at the center of the light receiving portion, a second inclination angle formed by the second inclined surface with respect to the tangential direction of the light receiving portion being larger at the edge of the light receiving portion than at the center of the light receiving portion, and the first inclined surfaces and the second inclined surfaces of adjacent triangular protrusions intersecting with each other on a same plane parallel to the side surface.

* * * * *